United States Patent Office 2,799,672
Patented July 16, 1957

2,799,672

NEW AZO DYESTUFFS

Hans R. Bolliger, Basel, Switzerland, assignor to Ciba Limited, Basel, Switzerland, a Swiss firm No Drawing. Application December 27, 1954, Serial No. 477,933

Claims priority, application Switzerland December 28, 1953

6 Claims. (Cl. 260—162)

This invention provides valuable new azo-dyestuffs, which contain an acid group imparting solubility in water but contain no N-acylated sulfonic acid amide groups, and also contain a group of the formula (1) 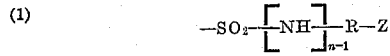

in which R represents an alkylene radical which may contain substituents, Z represents the radical of an organic sulfonic acid bound through an oxygen atom of its functional group to R, and $n$ represents a whole number not greater than 2.

The radical Z in the groups of the Formula 1 is advantageously present in the γ-position, or preferably in the β-position, of the alkylene radical R which is bound to the —SO$_2$— group in α-position either through the —NH— group when ($n=2$) or directly (when $n=1$). Especially valuable are the dyestuffs of this invention which contain a group of the Formula 1, in which Z represents the radical of an aliphatic or aromatic sulfonic acid.

In addition to a group of the Formula 1, the dyestuffs of this invention contain an acid group imparting solubility in water such, for example, as a —SO$_2$NH$_2$ group, a sulfone group, for example a methylsulfone group, a carboxyl group, or advantageously a sulfonic acid group, but no N-acylated sulfonic acid amide group.

The acid group imparting solubility and the group of the Formula 1 may be present in the dyestuff molecule in any desired positions, that is to say, a group of each kind may be present in the radical of a single component or one dyestuff component may contain, for example, the group imparting solubility, and the other component may contain the group of the Formula 1. Especially valuable are those monoazo-dyestuffs of the latter kind, which contain the group of the Formula 1 in the radical of the diazo component and the acid group imparting solubility in the radical of the coupling component.

In making the dyestuffs of the invention there are advantageously used dyestuff components which already contain the aforesaid groups. The dyestuff components to be used may, of course, contain other substituents such, for example, as halogen atoms, nitro groups, acylamino groups, alkyl groups or alkoxy groups. However, there are advantageously used diazo compounds which contain no hydroxyl group in ortho-position to the diazo group.

As examples of starting materials there may be mentioned the following:

A. Components which contain a group of the Formula 1, such as diazo compounds of the following amines: 1-aminobenzene-4-sulfonic acid-β-(ethane sulfonyloxy)-ethylamide, 1-aminobenzene-3- or -4-sulfonic acid-β-(benzene sulfonyloxy)-ethylamide, 1-aminobenzene-4-sulfonic acid-γ-(benzene sulfonyloxy)-propylamide, 1-aminobenzene-4-sulfonic acid-β-(para-toluene sulfonyloxy)-propylamide, 1-aminobenzene-3- or -4-sulfonic acid-β-(para-toluene sulfonyloxy)-ethylamide, 1-aminobenzene-3-sulfonic acid-N-methyl-N;β-(para-toluene sulfonyloxy)-ethylamide, 4-methyl-1-aminobenzene-3-sulfonic acid-β-(para-toluene sulfonyloxy)-ethylamide, 2:5-dichloro-1-aminobenzene-4-sulfonic acid-β-(benzene sulfonyloxy)-ethylamide, 2-methoxyl-1-aminobenzene-5-β-(para-toluene sulfonyloxy)-ethyl sulfone, 1-aminobenzene-2-, -3- or -4-sulfonic acid-β-(para-toluene sulfonyloxy)-ethyl sulfone and 4-methyl-1-aminobenzene-3-sulfonic acid-β-(benzene sulfonyloxy)-ethylamide, and the following coupling components: 2-aminonaphthalene-6-sulfonic acid-β-(benzene sulfonyloxy)-ethylamide, 1-hydroxynaphthalene-4- or -5-sulfonic acid-β-(benzene sulfonyloxy)-ethylamide, 2-hydroxynaphthalene-6-sulfonic acid-β-(benzene sulfonyloxy)-ethylamide, 2-hydroxynaphthalene-6-β-(benzene sulfonyloxy)-ethylamide, 2-hydroxynaphthalene-6-β-(benzene sulfonyloxy)-ethyl sulfone, 1-phenyl-3-methyl-5-pyrazolone-2'-, -3'- or -4'-sulfonic acid-β-(benzene sulfonyloxy)-ethylamide, 1-phenyl-3-methyl-5-pyrazolone-3'-sulfonic acid-γ-(benzene sulfonyloxy)-propylamide, 1-phenyl-3-methyl-5-pyrazolone-3'-β-(para-toluene sulfonyloxy)-ethyl sulfone and 1-phenyl-3-methyl-5-pyrazolone-3'-sulfonic acid-β-(para-toluene sulfonyloxy)-ethylamide.

B. Components containing an acid group imparting solubility of the kind mentioned above, such as diazo compounds of 1-aminobenzene-3- or -4-sulfonic acid amide, 1-aminobenzene-2-, -3- or -4-methyl sulfone, 1-aminobenzene-2-, -3- or -4-sulfonic acid, 2-methyl- or 2-methoxy-1-aminobenzene-4- or -5-sulfonic acid, 2-aminonaphthalene-6-sulfonic acid, and the following coupling components: 1-hydroxynaphthalene-4- or -5-sulfonic acid, 2-hydroxynaphthalene-3-, -4-, -5-, -6-, -7- or -8- sulfonic acid, 2:9-dihydroxynaphthalene-6-sulfonic acid, 2-aminonaphthalene-6-sulfonic acid, 2-amino-8-hydroxynaphthalene-6-sulfonic acid, 1-phenyl-5-pyrazolone-3-carboxylic acid, 1-phenyl-3-methyl-5-pyrazolone-2'-, -3'- or -4'-sulfonic acid, 1-(2'-chlorophenyl)-3-methyl-5-pyrazolone-4'-sulfonic acid and 1-(2':5'-dichlorophenyl)-3-methyl-5-pyrazolone-4'-sulfonic acid.

The monoazo-dyestuffs obtainable from the foregoing components by coupling a diazo compound mentioned under B with a coupling component mentioned under A or above all by coupling a diazo compound under A with a coupling component under B in a not strongly alkaline, and advantageously neutral to acid, medium, are new.

They are azo-dyestuffs which contain at least one acid group imparting solubility, but no N-acylated sulfonic acid amide group, and a group of the above Formula 1.

Especially valuable are the monoazo-dyestuffs of the formula (2) 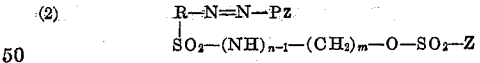

in which R represents the radical of a diazo-component of the naphthalene or advantageously benzene series, Z represents an aliphatic or aromatic radical, $m$ represents the whole number 2 or 3, $n$ represents a whole number not greater than 2, and Pz represents a 5-pyrazolone radical which contains in the 3- or advantageously 1-position an aryl radical containing a sulfonic acid group as a substituent.

The dyestuffs can be used for dyeing or printing a very wide variety of materials especially nitrogenous natural or artificial fibers such as leather, silk, wool and structures of superpolyamides or superpolyurethanes. They are suitable for dyeing from a weakly acid to approximately neutral bath. The dyeings so obtained are uniform and are distinguished by their good fastness to light and their excellent fastness to washing, fulling and alkali.

The following examples illustrate the invention, the parts and percentages being by weight:

Example 1

35.5 parts of 4-aminobenzene-β-(paratoluene-sulfonyloxy)-ethyl sulfone are diazotized in 100 parts of water and 25 parts of hydrochloric acid (density=1.18) with 6.9 parts of sodium nitrite, and the diazo compound is coupled with a solution of 26 parts of 1-phenyl-3-methyl-5-pyrazolone-4'-sulfonic acid and 30 parts of crystalline sodium acetate in 250 parts of water. When the coupling is finished the resulting dyestuff of the formula

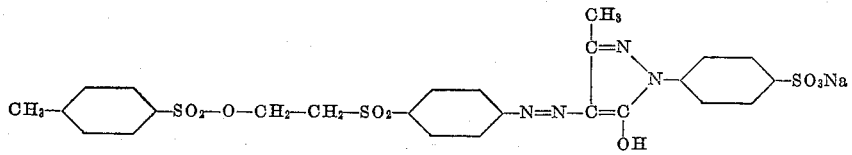

is salted out with sodium chloride, filtered and dried. There is obtained a yellow-red powder, which dissolves in water with a yellow coloration and dyes wool from a weakly acid bath pure yellow tints of good fastness to washing, fulling and light.

The diazo component used in this example is obtained by boiling 4-acetylaminobenzene-β-(paratoluene-sulfonyloxy)-ethyl sulfone (prepared from β-hydroxyethyl sulfone and the calculated quantity of paratoluene sulfochloride in pyridine) in hydrochloric acid (density=1.05) for ½ hour.

*Example 2*

40 parts of 1-methoxy-2-aminobenzene-4-sulfonic acid-N-β-(para-toluene sulfonyloxy)-ethylamide (prepared from 1-methoxy-2-acetylaminobenzene-4-sulfonic acid-N-β-hydroxyethylamide by reaction with paratoluene sulfochloride in pyridine followed by acid splitting of the acetylamino group) are diazotized as described in Example 1, and coupled with a solution of 26 parts of 1-phenyl-3-methyl-5-pyrazolone-3'-sulfonic acid and 30 parts of crystalline sodium acetate in 250 parts of water. By working up in the usual manner there is obtained the dyestuff which in form of its sodium salt corresponds to the formula

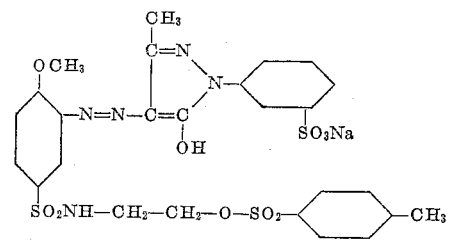

The new dyestuff, an orange-red powder, dissolves in water a red-yellow coloration and dyes wool from a weakly acid bath pure yellow tints of excellent fastness to washing, fulling and light.

From the diazo components and coupling components mentioned in columns I and II of the following table there are obtained by the above method similar dyestuffs which dye wool from neutral to weakly acid baths in the tints given in column III:

| | I Diazo component | II Coupling component | III |
|---|---|---|---|
| 1 | NH₂–⟨benzene⟩–SO₂NH–CH₂–CH₂–O–SO₂–⟨benzene⟩ | CH₃–C=N, CH=C(OH)– pyrazolone N–⟨benzene, 2,6-Cl₂⟩–SO₃H | greenish yellow. |
| 2 | OCH₃–⟨benzene⟩–NH₂, SO₂NH–CH₂–CH₂–O–SO₂–⟨benzene⟩–CH₃ | CH₃–C=N, CH=C(OH)– pyrazolone N–⟨benzene, 2,6-Cl₂⟩–SO₃H | Do. |
| 3 | CH₃–⟨benzene⟩–SO₂NH–CH₂–CH₂–O–SO₂–⟨benzene⟩, NH₂ | CH₃–C=N, CH=C(OH)– pyrazolone N–⟨benzene⟩–SO₃H | pure yellow. |
| 4 | CH₃–⟨benzene⟩–SO₂–NH–CH₂–CH₂–O–SO₂–⟨benzene⟩–CH₃, NH₂ | OH–⟨naphthalene⟩–SO₃H | yellow red. |
| 5 | CH₃–⟨benzene⟩–SO₂–NH–CH₂–CH₂–O–SO₂–⟨benzene⟩–CH₃, NH₂ | OH–⟨naphthalene⟩–(HO, SO₃H) | red. |

| | I<br>Diazo component | II<br>Coupling component | III |
|---|---|---|---|
| 6 | 4-methyl-2-amino-benzene sulfonic acid β-(p-toluenesulfonyloxy)-ethylamide [CH₃-, NH₂- substituted benzene-SO₂-NH-CH₂-CH₂-O-SO₂-C₆H₄-CH₃] | 1-hydroxy-8-amino-naphthalene sulfonic acid [H₂N-, OH-, SO₃H- naphthalene] | (acid coupling) reddish bordeaux. |
| 7 | 2-amino-anisole-4-sulfonic acid β-(ethylsulfonyloxy)-ethylamide [OCH₃, NH₂, SO₂-NH-CH₂CH₂-O-SO₂-C₂H₅ benzene] | 1-(4'-sulfophenyl)-3-methyl-5-pyrazolone [CH₃-C=N, N-C₆H₄-SO₃H, HC=C-OH] | yellow. |
| 8 | metanilic acid [SO₃H, NH₂ benzene] | 2-amino-naphthalene-6-sulfonic acid β-(p-toluenesulfonyloxy)-ethylamide [H₂N- naphthalene -SO₂-NH-CH₂CH₂-O-SO₂-C₆H₄-CH₃] | yellow orange. |
| 9 | 2-amino-anisole-4-sulfonic acid γ-(ethylsulfonyloxy)-propylamide [OCH₃, NH₂, SO₂-NH-(CH₂)₃-O-SO₂C₂H₅ benzene] | 1-(4'-sulfophenyl)-3-methyl-5-pyrazolone [CH₃-C=N, N-C₆H₄-SO₃H, HC=C-OH] | yellow. |

The 2-aminonaphthalene-6-sulfonic acid β-(tosyloxy)-ethylamide necessary for making dyestuff No. 8 of the above table can be prepared, for example, by treating 2-acetylamino naphthalene-6-sulfonic acid-β-hydroxyethylamide in pyridine with para-toluene sulfochloride, pouring the reaction mixture into ice water, and hydrolyzing the acetyl group in the resulting reaction product with dilute hydrochloric acid with the aid of heat.

Example 3

0.5 part of the dyestuff obtainable as described in Example 1 is dissolved in 4000 parts of water, 10 parts of crystalline sodium sulfate are added, and 100 parts of well wetted wool are entered into the resulting dyebath at 40–50° C. 2 parts of acetic acid of 40 percent strength are then added, the temperature is raised to the boil in the course of ½ hour, and dyeing is carried on at the boil for ¾ hour. Finally the wool is rinsed with cold water and dried. There is obtained a level yellow dyeing of good fastness to light and excellent fastness to washing.

A level yellow dyeing of good fastness to light and excellent fastness to washing is also obtained by proceeding in the manner described above, but without the addition of acetic acid to the dyebath.

What is claimed is:

1. A monoazo dyestuff which in its free acid form corresponds to the formula

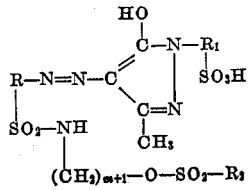

wherein R, R₁ and R₂ each represents a benzene radical, and $m$ represents a whole number up to 2.

2. A monoazo dyestuff which in its free acid form corresponds to the formula

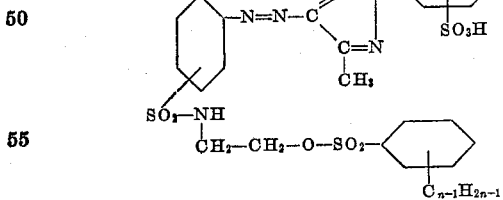

wherein $m$, $n$ and $p$ each represents a whole number up to two, X and Y each represents a member selected from the group consisting of a chlorine and a hydrogen atom.

3. The monoazo dyestuff which in its free acid form corresponds to the formula

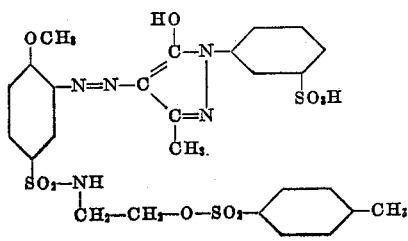

4. The monoazo dyestuff which in its free acid form corresponds to the formula
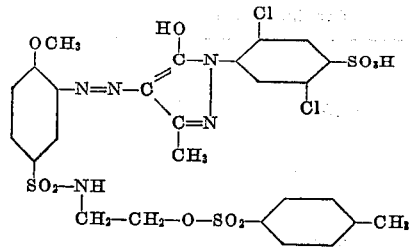
5. The monoazo dyestuff which in its free acid form corresponds to the formula
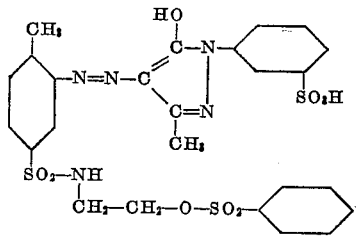
6. The monoazo dyestuff which in its free acid form corresponds to the formula
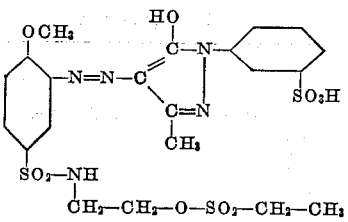
References Cited in the file of this patent
UNITED STATES PATENTS
| | | |
|---|---|---|
| 1,857,244 | Hentrich et al. | May 10, 1932 |
| 2,424,493 | Muller et al. | July 22, 1947 |